United States Patent Office 3,759,868
Patented Sept. 18, 1973

3,759,868
CARBOXYNITROSO-POLYBUTADIENE VULCANIZATE
Robert A. Meyers, Encino, and Eugene A. Burns, Palos Verdes Peninsula, Calif., assignors to TRW Inc., Redondo Beach, Calif.
No Drawing. Filed Dec. 28, 1970, Ser. No. 102,269
Int. Cl. C08d 9/08; C08f 45/04
U.S. Cl. 260—41.5 R                10 Claims

ABSTRACT OF THE DISCLOSURE

A decrease in permeability and an increase in resistance of carboxynitroso rubbers can be effected by the addition of small amounts of polybutadiene resins. Liquid functionally terminated polybutadiene is mixed into a terpolymer containing trifluoronitrosomethane, tetrafluoroethylene, and a small amount of nitrosoperfluorobutyric acid. The mixture is cured in the presence of a peroxide free radical initiator.

Carboxynitroso rubber is substantially a blend of equal amounts of trifluoronitrosomethane and tetrafluoroethylene and a small amount of 4-nitrosoperfluorobutyric acid. Various additive compounds such as chromium trifluoroacetate or dicyclopentadiene dioxide can be incorporated to improve processing and final properties. Because of the highly fluorinated materials making up the elastomer, excellent chemical and thermal properties are exhibited. The outstanding chemical resistance of the rubber is best illustrated by its compatibility with nitrogen tetroxide, fuming nitric acid, aromatic or aliphatic solvents, acids, or bases, while its failure to ignite or burn in an atmosphere of 100% oxygen is a clear demonstration of its thermal stability. In addition to its attractive chemical and thermal properties, it has the physical characteristics of a synthetic rubber over a temperature range of from about $-40°$ C. to about $+200°$ C.

Although carboxynitroso rubber exhibits chemical resistance properties far exceeding those of other rubbers, it has been discovered that the chemical resistance can be significantly improved and the permeability can be significantly decreased by the addition of small amounts of polybutadiene. More specifically, the small amounts of 4-nitrosoperfluorobutyric acid added to carboxynitroso rubber gum stock renders the gum stock capable of reaction with a functionally terminated polybutadiene. The 4-nitrosoperfluorobutyric acid is added in amounts ranging from about 0.25 mole percent to about 8 mole percent, with the preferred amount being about 1 mole percent. Commensurately, the amount of trifluoronitrosomethane ranges from about 42 moles percent to about 49.75 mole percent, with the preferred being about 49 mole percent. The tetrafluoroethylene is constant at 50 mole percent.

The functionally terminated polybutadiene may be selected from amino terminated polybutadiene, mercapto terminated polybutadiene, commercially available hydroxy terminated polybutadiene or from isocyanate terminated polybutadiene. The isocyanate terminated polybutadiene can be prepared by reacting commercially available hydroxy terminated polybutadiene with twice the molar equivalent of a diisocyanate to produce an isocyanate terminated polybutadiene. Because of the reactive isocyanate groups on the polybutadiene, the liquid material should be sealed from moisture and used within a brief time after preparation.

Suitable diisocyanates may be selected from the following:

TABLE I 2,4-tolylene diisocyanate
2,6-tolylene diisocyanate
hexamethylene diisocyanate
trimethylene diisocyanate
pentamethylene diisocyanate
1,4-benzene diisocyanate
butylene 1,2-diisocyanate
butylene 1,4-diisocyanate After preparation of the carboxynitroso rubber terpolymer, the polybutadiene is mixed on a rubber mill with the terpolymer in an amount which is approximately stoichiometric with the 4-nitrosoperfluorobutyric acid. After the components are mixed thoroughly on the rubber mill, the mixed gum stock is sheeted off and placed in an oven for about 16–18 hours at temperatures from room temperature to about 110° C. An intermediate elastomer which is believed to be chains of the carboxynitroso terpolymer crosslinked by the polybutadiene is formed by this treatment.

After the terpolymer and the polybutadiene have been milled and reacted, the elastomeric intermediate is returned to the rubber mill to add peroxides and fillers. The peroxide can be incorporated either into the polybutadiene prior to mixing with the terpolymer, or it can be added after the terpolymer and the polybutadiene have been reacted to form the intermediate elastomer. Although either step works satisfactorily, there are certain inherent advantages which can be considered with each approach. In one instance, because the peroxide tends to attack the fluorine and the hydrogen on the terpolymer to generate hydrogen fluoride, it may be desirable to add the peroxide as late in the processing as possible to minimize the contact of the peroxide with the terpolymer. In other instance, the peroxide is intended to cure only the polybutadiene, and therefore, to insure that the peroxide and polybutadiene come into intimate contact, it may be desirable to add the peroxide to the polybutadiene prior to milling with the terpolymer. Either way the peroxide may be added in amounts ranging from 0.1% to approximately 20% by weight based on the amount of the polybutadiene used, with about 5% by weight preferred.

Some of the suitable peroxide free radical initiators are as follows:

TABLE II di-t-butyl peroxide
dicumyl peroxide
decanoyl peroxide
methyl ethyl ketone peroxide
2,5-dimethyl-2,5-di(t-butyl peroxy) hexane
lauroyl peroxide
acetyl peroxide
cumene hydroperoxide
t-butyl perbenzoate Reinforcing fillers, such as lithium fluoride, calcium fluoride, ferric fluoride, titanium fluoride, silicon dioxide, titanium dioxide, and magnesium fluoride, can be added in amounts from about 1% to about 50% by volume without adversely affecting the quality of the end product. The filler can be of any material which is inert to the conditions of the process, the components used, and the media to be contacted by the rubber in service.

Because there is the inevitable decomposition of small amounts of the fluorine polymers under conditions used in processing, it is necessary to add an alkaline earth salt acid acceptor to the polymer mix. This acid acceptor reacts with the evolved hydrogen fluoride to prevent corrosion of the mold and bubbling in the molded part. Approximately 1% to 25% by weight of acid acceptor can be used in the formulation of the rubber with beneficial results, and the reinforcing filler material can be reduced proportionally if it is desired to keep the amount of filler below a predetermined maximum.

Suitable acid acceptors may be selected from the following:

TABLE III magnesium oxide
calcium oxide
strontium oxide
barium oxide

Final cure of the elastomeric intermediate is effected in a mold made of inert material to prevent reaction with the evolved hydrogen fluoride. Suitable mold materials can be selected from stainless steel, Teflon coated metal, or chromium plated metal.

Cure conditions may range from about 30 minutes at about 90° C. to about 150° C. Higher cure temperatures, viz, around 200° C., tend to decompose the constituents in the intermediate elastomer and produce bubbles. If upgrading of the final properties is desired, a 24 hour post cure at about 90° C. will make the polymer come compatible with severly oxidizing chemicals.

Although the final product does not lend itself to analysis of the chemical structure readily, it is hypothesized that the carboxynitroso rubber perfluorobutyric acid terpolymer and polybutadiene react in the following ways:

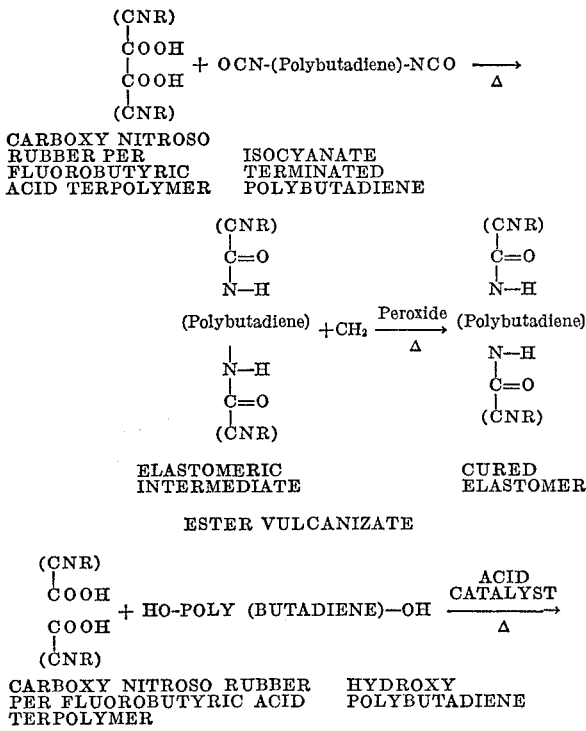

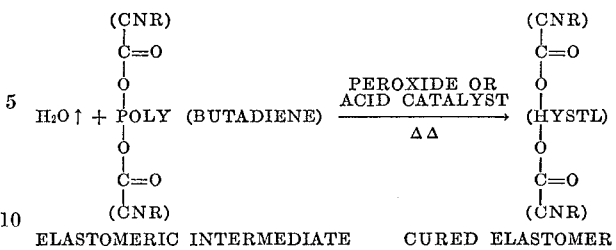

It is believed that the functional groups on the polybutadiene react with the acid group of the perfluorobutyric acid to form very long flexible crosslinks which will permit carbon dioxide or water to escape the matrix readily upon heating. The subsequent cure at elevated temperatures forms a tight crosslink which encircles the carboxynitroso rubber carbonyl site with a highly resistant hydrocarbon structure and closes the matrix to produce a less permeable rubber. Thus, the polybutadiene matrix not only decreases permeability but also protects the amide or ester linkage at the crosslink origin.

The following specific embodiment will better illustrate the present invention.

EXAMPLE I

Approximately 100 grams of carboxynitroso terpolymer gum stock was fed onto a rubber mill and was worked until it banded. Approximately 5.6 grams of polybutadiene diisocyanate, molecular weight about 2000, was poured onto the mill, cross cut several times, and end rolled. The gum stock mixture was sheeted off then and placed in an oven for about 18 hours at about 65° C. to form an elastomer. The intermediate elastomer was removed from the oven and returned to the rubber mill where 25 grams of silicon dioxide, 5 grams of magnesium oxide, and 0.6 gram of dicumyl peroxide were added to the intermediate elastomer. The filled elastomer was again cross cut several times and end rolled. Prior to sheeting off the elastomer, the mill was opened to give a sheet slightly thicker than the mold to be used. The filled elastomer sheet was cut and placed in the mold to cure for 15 minutes at 120° C., 15 minutes at 150° C. and 5 minutes at 175° C. The cured specimen had the following properties:

Modulus at 100% elongation, p.s.i. _____ 700
Tensile strength, p.s.i. _____ 2025
Elongation at break, percent _____ 510
Shore A hardness _____ 85

The following example illustrates the properties of carboxynitroso rubber when the polybutadiene is not added to the terpolymer.

EXAMPLE II

Approximately 100 grams of carboxynitroso terpolymer gum stock was fed onto a rubber mill and was worked until it banded. The gum stock was sheeted off and placed in an oven for one hour at 120° C., one hour at 150° C. and 16 hours at 175° C. to form an elastomer. The elastomer was removed from the oven and returned to the rubber mill where 20 grams of silicone oil coated silicon dioxide and approximately 5 grams of chromium trifluoroacetate were added to the elastomer. The filled elastomer was cross cut and end rolled. Prior to sheeting off, the mill was opened to give a sheet slightly thicker than the mold to be used. The sheet was cut and placed in the mold to cure for 15 minutes at 120° C. and 30 minutes at 175° C. The cured specimen had the following properties:

Modulus at 100% elongation, p.s.i. _____ 265
Tensile strength, p.s.i. _____ 525
Elongation at break, percent _____ 280
Shore A hardness _____ 80

In addition to imparting improved mechanical properties to the carboxynitroso terpolymer, the addition of 2 mole percent of polybutadiene to the terpolymer significantly reduced the permeability of the terpolymer to nitrogen tetroxide. It was found that the terpolymer, alone, had permeability of 5 mg. of nitrogen tetroxide per square centimeter, while the addition of 2 mole percent of polybutadiene reduced the permeability to about 0.1 mg. of nitrogen tetroxide per square centimeter in the same time period.

We claim:

1. A carboxynitroso-polybutadiene vulcanizate comprising
    (A) a terpolymer of 42 to 49.75 mole percent trifluoronitrosomethane, 50 mole percent tetrafluoroethylene, and 0.25 to 8 mole percent nitrosoperfluorobutyric acid;
    (B) a functionally terminated polybutadiene selected from the group consisting of amino terminated polybutadiene, mercapto terminated polybutadiene, hydroxy terminated polybutadiene, and isocyanate terminated polybutadiene in an amount which is stoichiometric with nitrosoperfluorobutyric acid;
    (C) a peroxide free radical initiator; and
    (D) an alkaline earth acid acceptor.

2. A vulcanizate according to claim 1 wherein said acid acceptor is selected from the group consisting of magnesium oxide, calcium oxide, strontium oxide, and barium oxide.

3. A vulcanize according to claim 1 wherein a reinforcing filler selected from the group consisting of lithium fluoride, calcium fluoride, ferric fluoride, titanium fluoride, silicon oxide and titanium dioxide is included in said vulcanizate.

4. A vulcanizate according to claim 1 wherein said peroxide is selected from the group consisting of dicumyl peroxide, di-t-butyl peroxide, decanoyl peroxide, t-butyl perbenzoate, lauroyl peroxide, methyl ethyl ketone peroxide, and 2,5-dimethyl-2,5-di(t-butylperoxy) hexane.

5. A process for the preparation of carboxynitroso-polybutadiene vulcanizates comprising;
    (A) milling a mixture of a terpolymer of 42 to 49.75 mole percent trifluoronitrosomethane, 50 mole percent tetrafluoroethylene, and 0.25 to 8 mole percent nitrosoperfluorobutyric acid with a functionally terminated polybutadiene, selected from the group consisting of amino terminated polybutadiene, mercapto terminated polybutadiene, hydroxy terminated polybutadiene, and isocyanate terminated polybutadiene in an amount which is stoichiometric with nitrosoperfluorobutyric acid;
    (B) reacting said acid with said polybutadiene to form intermediate elastomer;
    (C) adding an alkaline earth acid acceptor to said elastomer; and
    (D) curing said elastomer in the presence of a peroxide free radical initiator.

6. A process according to claim 5 wherein said acid acceptor is selected from the magnesium oxide, calcium oxide, strontium oxide, and barium oxide.

7. A process according to claim 5 wherein said peroxide is selected from the group consisting of dicumyl peroxide, di-t-butyl peroxide, decanoyl peroxide, t-butyl perbenzoate, lauroyl peroxide, methyl ethyl ketone peroxide, and 2,5-dimethyl-2,5-di(t-butylperoxy) hexane.

8. A process according to claim 6 wherein a reinforcing filler is selected from the group consisting of lithium fluoride, calcium fluoride, ferric fluoride, titanium fluoride, silicon dioxide, and titanium dioxide, is added to said elastomer.

9. A vulcanizate according to claim 1 wherein the terpolymer comprises 1 mole percent nitrosoperfluorobutyric acid, 49 mole percent trifluoronitrosomethane, and 50 mole percent tetrafluoroethylene.

10. A process according to claim 5 wherein the terpolymer comprises 1 mole percent nitrosoperfluorobutyric acid, 49 mole percent trifluoronitrosomethane, and 50 mole percent tetrafluoroethylene.

References Cited
UNITED STATES PATENTS

| | | | |
|---|---|---|---|
| 3,282,884 | 11/1968 | Green | 260—92.1 A |
| 3,321,454 | 5/1967 | Crawford et al. | 260—92.1 A |
| 3,417,068 | 12/1968 | Knoll | 260—92.1 A |
| 3,427,279 | 2/1969 | Green | 260—41 R |
| 3,554,885 | 1/1971 | Oliver | 260—92.1 A |
| 3,573,267 | 3/1971 | Green | 260—92.1 A |
| 3,223,676 | 12/1965 | Rucker | 260—889 |

MORRIS LIEBMAN, Primary Examiner

S. L. FOX, Assistant Examiner

U.S. Cl. X.R.

260—41.5 A, 92.1 A, 890